J. F. NAULTY.
Disinfecting-Attachment to Water-Closets.
No. 203,186. Patented April 30, 1878.
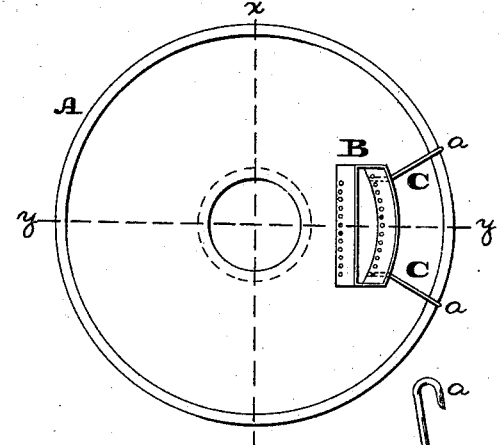
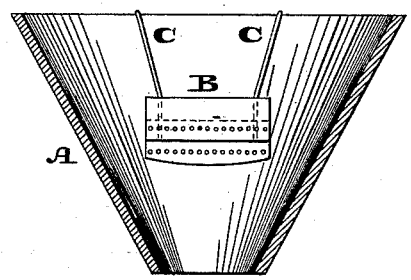
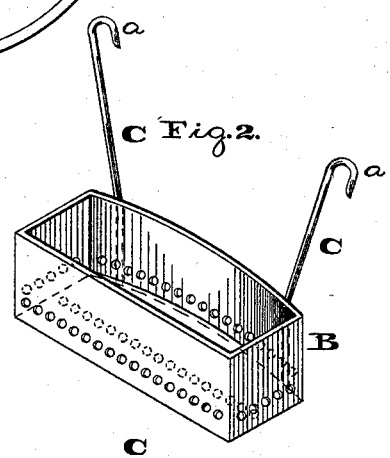
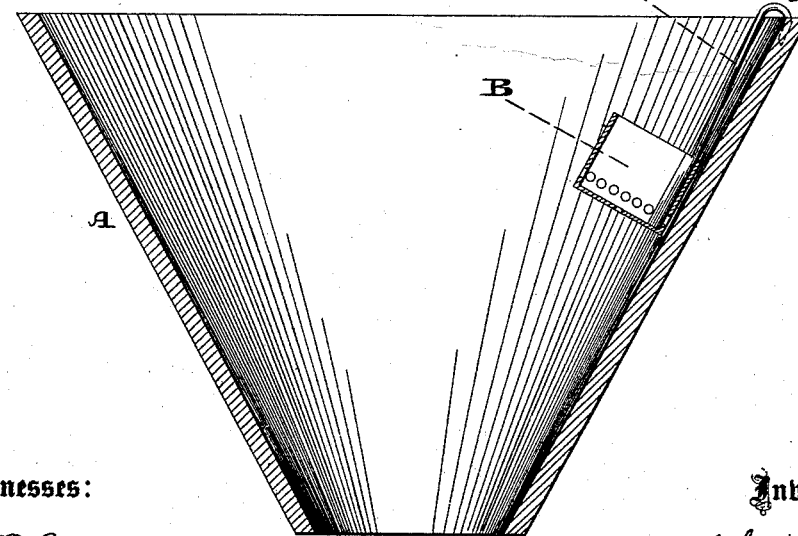
Witnesses:
A. P. Grant.
N. F. Kircher.
Inventor:
John F. Naulty,
by John A. Wiedersheim
ATTORNEY.

UNITED STATES PATENT OFFICE.

JOHN F. NAULTY, OF PHILADELPHIA, PENNSYLVANIA, ASSIGNOR OF ONE-HALF HIS RIGHT TO CHARLES S. GREENE, OF SAME PLACE.

IMPROVEMENT IN DISINFECTING ATTACHMENTS TO WATER-CLOSETS.

Specification forming part of Letters Patent No. 203,186, dated April 30, 1878; application filed January 19, 1878.

*To all whom it may concern:*

Be it known that I, JOHN F. NAULTY, of the city and county of Philadelphia, and State of Pennsylvania, have invented a new and useful Improvement in Disinfecting Attachments to Water-Closets, which improvement is fully set forth in the following specification and accompanying drawings, in which—

Figure 1 is a top or plan view of a water-closet bowl having my attachment applied thereto. Fig. 2 is a perspective view thereof. Fig. 3 is a vertical section in line $x\,x$, Fig. 1. Fig. 4 is a vertical section in line $y\,y$, Fig. 1.

Similar letters of reference indicate corresponding parts in the several figures.

My invention consists of a pan receiving disinfecting material, and adapted to be suspended within a water-closet bowl from the top thereof, in such position that the water designed to cleanse the bowl will flow therethrough or thereagainst, and thus carry with it some of the disinfecting material, the pan being readily replenished, and it is adjustable to bowls already set and in use.

Referring to the drawings, A represents a water-closet bowl, which may be of well-known form and construction. B represents a pan, which is perforated on its several sides and bottom, and open or perforated on top, and has attached to it arms C C, whose upper ends are hooked, as at $a$, whereby the pan may be readily suspended.

The operation is as follows: A piece of carbolic soap or other disinfectant substance will be placed in the pan A, and the latter hung from the top of the water-closet bowl in such position that, when the water is turned on, the water will wash through the pan, and thus take from the disinfectant some of its nature, so that the removed disinfectant will wash the bowl and enter the trap and sewer or cess-pool, or other conveyer and receptacle, the advantages of which are evident.

The volatile matters of the disinfectant are also evolved, and they serve to counteract the noxious vapors of the contents of the bowl and of the closet generally.

It will be seen that as the pan B is perforated on all sides and bottom, and open or perforated on top, the water will be permitted to pass freely through the pan, and thus reach the contents thereof.

It will also be seen that the pan is readily suspended from the top of the bowl, and thus supported; and it may be shifted, in order to be properly located and adjusted, no alteration of the bowl being requisite to accommodate the pan.

The pan may be replenished with ease, and its removal is a matter of convenience.

Having thus described my invention, what I claim as new, and desire to secure by Letters Patent, is—

1. The disinfectant attachment to water-closets, the same consisting of a pan adjustably suspended from the bowl and detachable therefrom, substantially as and for the purpose set forth.

2. The disinfecting attachment to water-closets, the same consisting of the perforated pan B, with hooked arms C, whereby said pan may be adjustably suspended from the bowl, and it is detachable therefrom, substantially as and for the purpose set forth.

JOHN F. NAULTY.

Witnesses:
JOHN A. WIEDERSHEIM,
H. R. SHULTZ.